(12) United States Patent
Nishimura

(10) Patent No.: US 12,037,045 B2
(45) Date of Patent: Jul. 16, 2024

(54) FRONT BODY STRUCTURE OF VEHICLE

(71) Applicant: SUBARU CORPORATION, Tokyo (JP)

(72) Inventor: Naoki Nishimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 143 days.

(21) Appl. No.: 17/699,515

(22) Filed: Mar. 21, 2022

(65) Prior Publication Data
US 2022/0348261 A1   Nov. 3, 2022

(30) Foreign Application Priority Data

Apr. 28, 2021 (JP) ................................. 2021-076663

(51) Int. Cl.
| | | |
|---|---|---|
| *B62D 21/15* | (2006.01) | |
| *B60R 19/34* | (2006.01) | |
| *B60J 1/00* | (2006.01) | |
| *B60J 1/02* | (2006.01) | |
| *B60J 1/17* | (2006.01) | |
| *B60J 1/20* | (2006.01) | |
| *B60R 19/24* | (2006.01) | |
| *B62D 25/08* | (2006.01) | |

(52) U.S. Cl.
CPC ............ *B62D 21/152* (2013.01); *B60R 19/34* (2013.01); *B60J 1/007* (2013.01); *B60J 1/02* (2013.01); *B60J 1/17* (2013.01); *B60J 1/2097* (2013.01); *B60R 2019/247* (2013.01); *B62D 25/08* (2013.01)

(58) Field of Classification Search
CPC ... B60J 1/007; B60J 1/02; B60J 1/2097; B60J 1/17; B62D 21/152; B62D 25/08; B60R 19/34; B60R 2019/247
USPC .......................................................... 296/187.1
See application file for complete search history.

(56) References Cited

U.S. PATENT DOCUMENTS

| | | | |
|---|---|---|---|
| 10,807,548 B2 * | 10/2020 | Wada .................... | B62D 21/152 |
| 2012/0248820 A1 | 10/2012 | Yasui et al. | |

FOREIGN PATENT DOCUMENTS

| | | | |
|---|---|---|---|
| DE | 10128114 B4 * | 12/2006 | ............. B60R 19/34 |
| JP | 2012-214211 A | 11/2012 | |
| JP | 2015189407 A * | 11/2015 | |

* cited by examiner

*Primary Examiner* — Amy R Weisberg
*Assistant Examiner* — Dana D Ivey
(74) *Attorney, Agent, or Firm* — MCGINN I.P. LAW GROUP, PLLC

(57) ABSTRACT

A front body structure provided on a vehicle includes a bumper beam, a left frame and a right frame in pairs, stays, and gussets. The bumper beam extends in a left-right direction at a front end of the vehicle. The frames extend in a front-rear direction. The stays support the bumper beam. The stays are provided at front ends of the frames. The gussets are disposed separated from the bumper beam. Each of the gussets extend inclined outward in the left-right direction, and obliquely forward from an outer end of a corresponding one of the left frame and the right frame to ahead of a front end of a corresponding one of the left frame and the right frame. Each of the stays includes a bead at a predetermined position in the front-rear direction. Each of the beads extends in a circumferential direction of the respective one of the stays.

15 Claims, 6 Drawing Sheets

FRONT BODY STRUCTURE OF VEHICLE

CROSS-REFERENCE TO RELATED APPLICATIONS

The present application claims priority from Japanese Patent Application No. 2021-076663 filed on Apr. 28, 2021, the entire contents of which are hereby incorporated by reference.

BACKGROUND

The disclosure relates to a front body structure of a vehicle in which a stay supporting a bumper beam is provided at a front end of a frame extending in a front-rear direction.

In front body structures of a vehicle, a stay supporting a bumper beam is generally provided at a front end of a frame extending in a front-rear direction (for example, refer to Japanese Unexamined Patent Application Publication (JP-A) No. 2012-214211). The front body structure described in JP-A No. 2012-214211 is provided with a branch frame extending obliquely forward from a lateral portion of a power unit of the frame to an outside in a vehicle width direction, and a front end of the frame and a front end of the branch frame are coupled by a coupling member. The branch frame extends from a lateral position of the power unit to the same position as that of the front end of the frame in the front-rear direction. Accordingly, it is possible to efficiently absorb collision energy in a narrow offset collision (small overlap frontal collision) in which a colliding object such as an oncoming vehicle collides frontally with an outside of the frame of the vehicle in the vehicle width direction.

SUMMARY

An aspect of the disclosure provides a front body structure that is provided on a vehicle. The front body structure includes a bumper beam, a left frame and a right frame in pairs, stays, and gussets. The bumper beam extends in a left-right direction of the vehicle at a front end of the vehicle. The left frame and the right frame extend in a front-rear direction of the vehicle. The stays support the bumper beam. Each of the stays is disposed at a front end of a corresponding one of the left frame and the right frame. The gussets are disposed so as to be separated from the bumper beam. Each of the gussets extends inclined outward in the left-right direction, and obliquely forward from a corresponding one of an outer end of the left frame and an outer end of the right frame to a corresponding one of ahead of a front end of the left frame and ahead of a front end of the right frame. Each of the stays includes a bead at a predetermined position in the front-rear direction. Each of the beads extends in a circumferential direction of the respective one of the stays.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the body structure described in JP-A No. 2012-214211, in the small overlap frontal collision, a load from the colliding object is transmitted to the stay before being transmitted to the branch frame. Therefore, the stay is moved toward an inner side in a left-right direction without being crushed at an initial stage of the collision, and a sufficient reaction force may not be generated against an input force from the colliding object.

It is desirable to provide a front body structure of a vehicle capable of preventing a stay from being moved toward an inner side in a left-right direction at an initial stage of a small overlap frontal collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
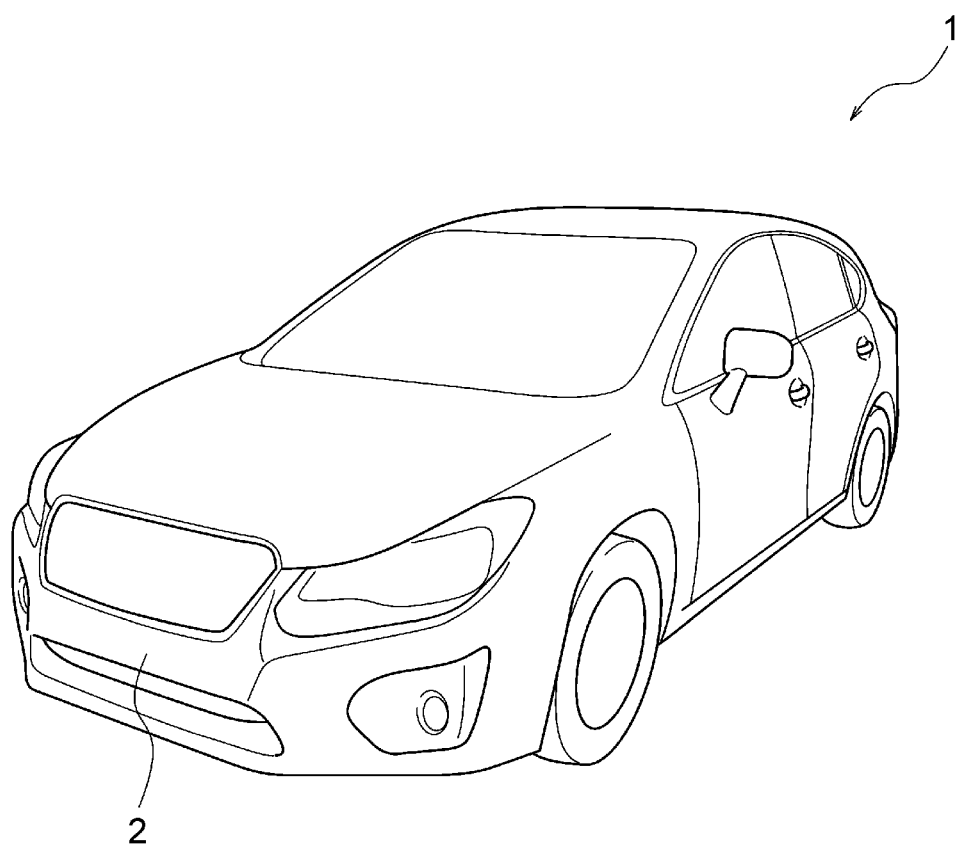
FIG. 1 is an external perspective view of a vehicle illustrating an embodiment of the disclosure.
Figure 2:
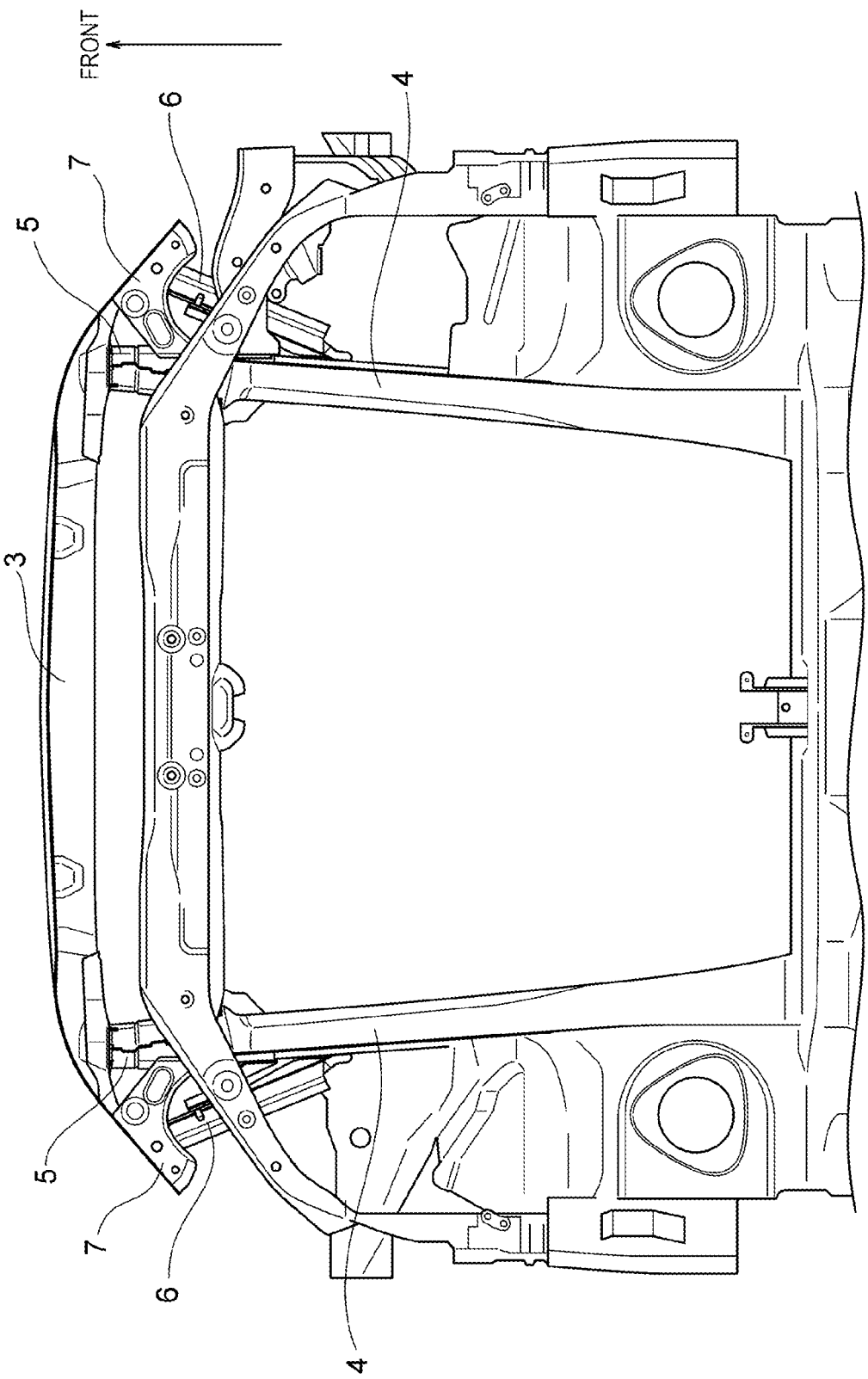
FIG. 2 is a partial plan view of a front body structure of the vehicle.
Figure 3:
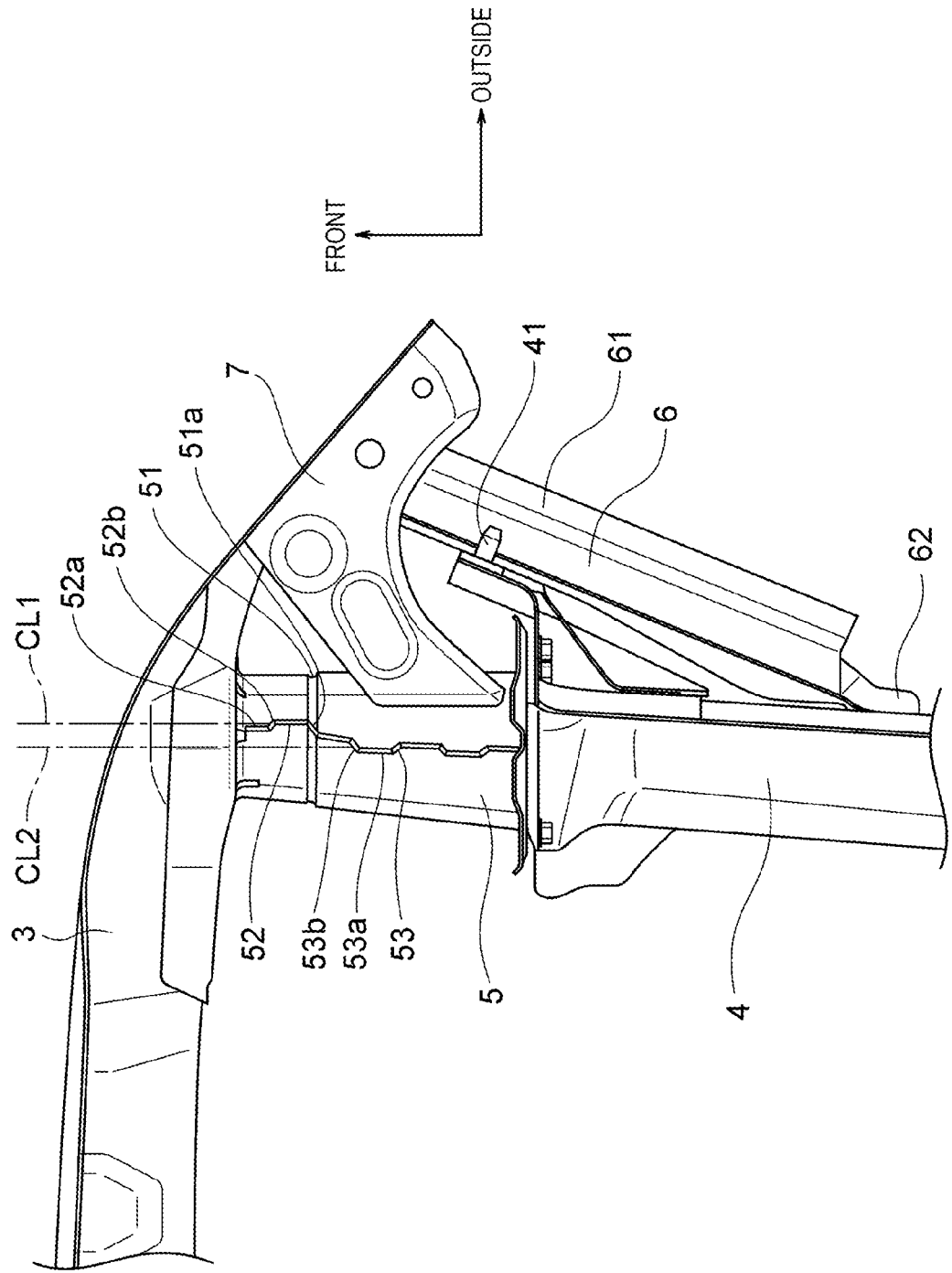
FIG. 3 is a partial plan view of the front body structure of the vehicle.
Figure 4:
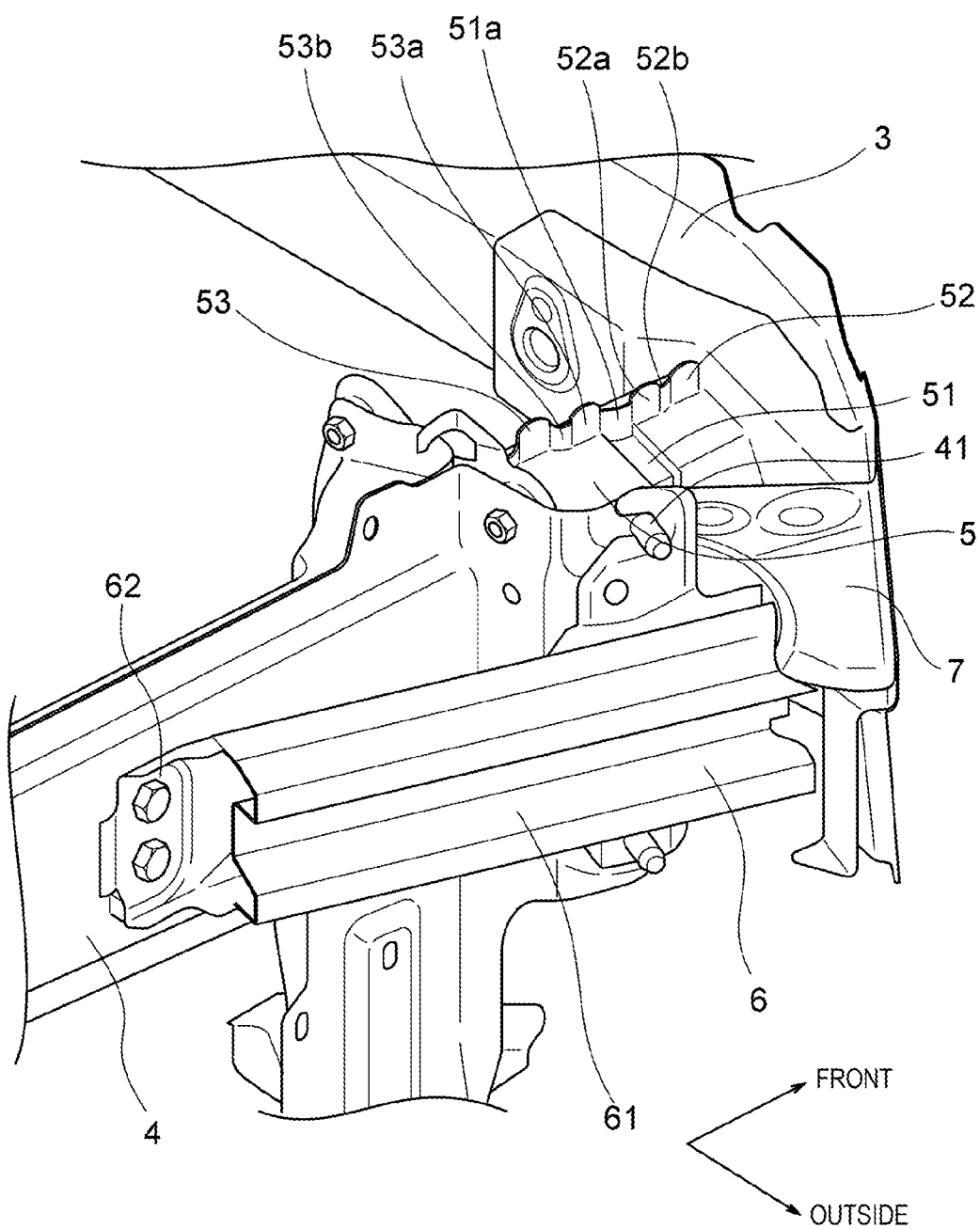
FIG. 4 is a partial perspective view of the front body structure of the vehicle.
Figure 5:
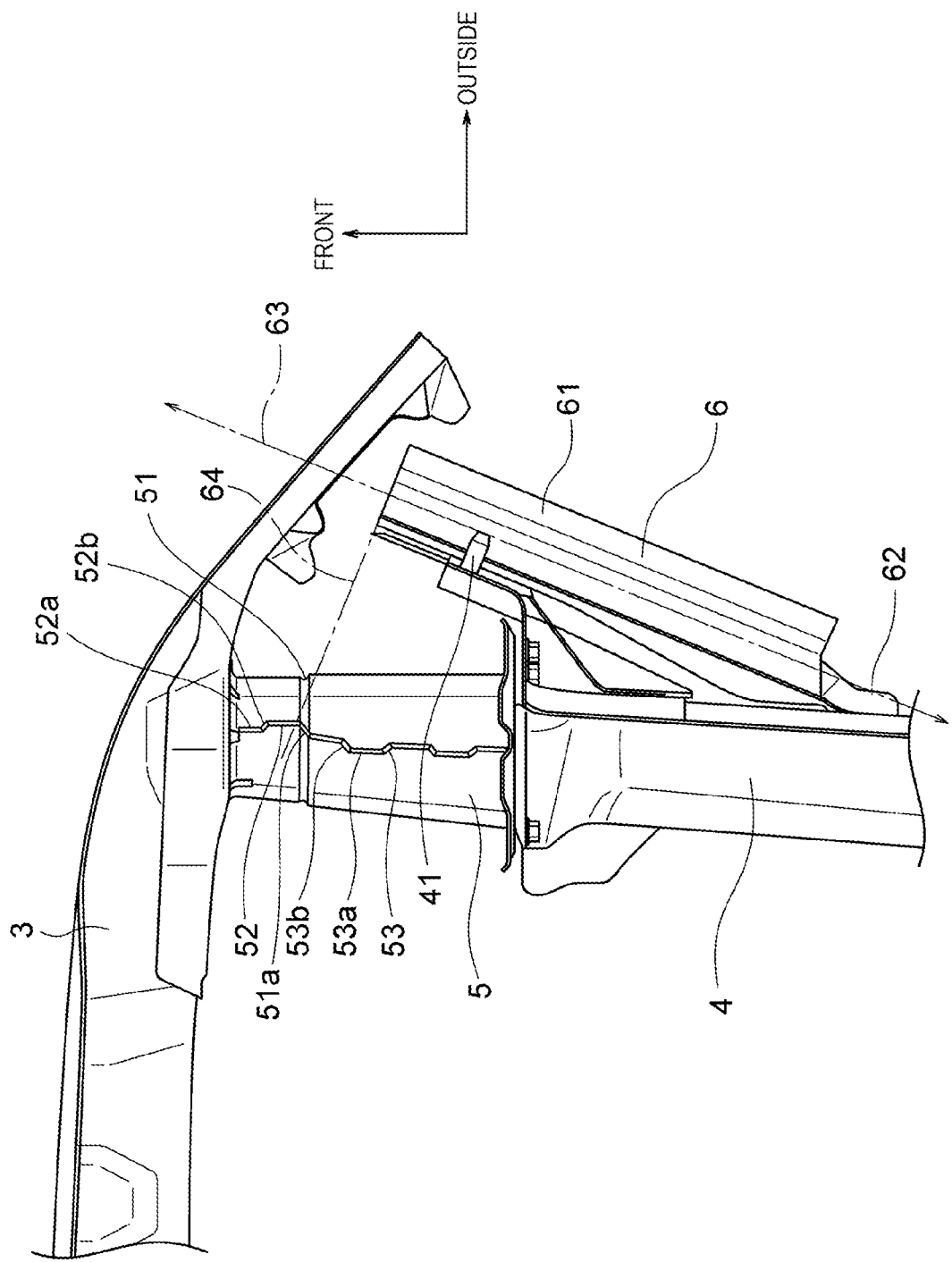
FIG. 5 is a partial plan view of the front body structure with a cover removed.
Figure 6:
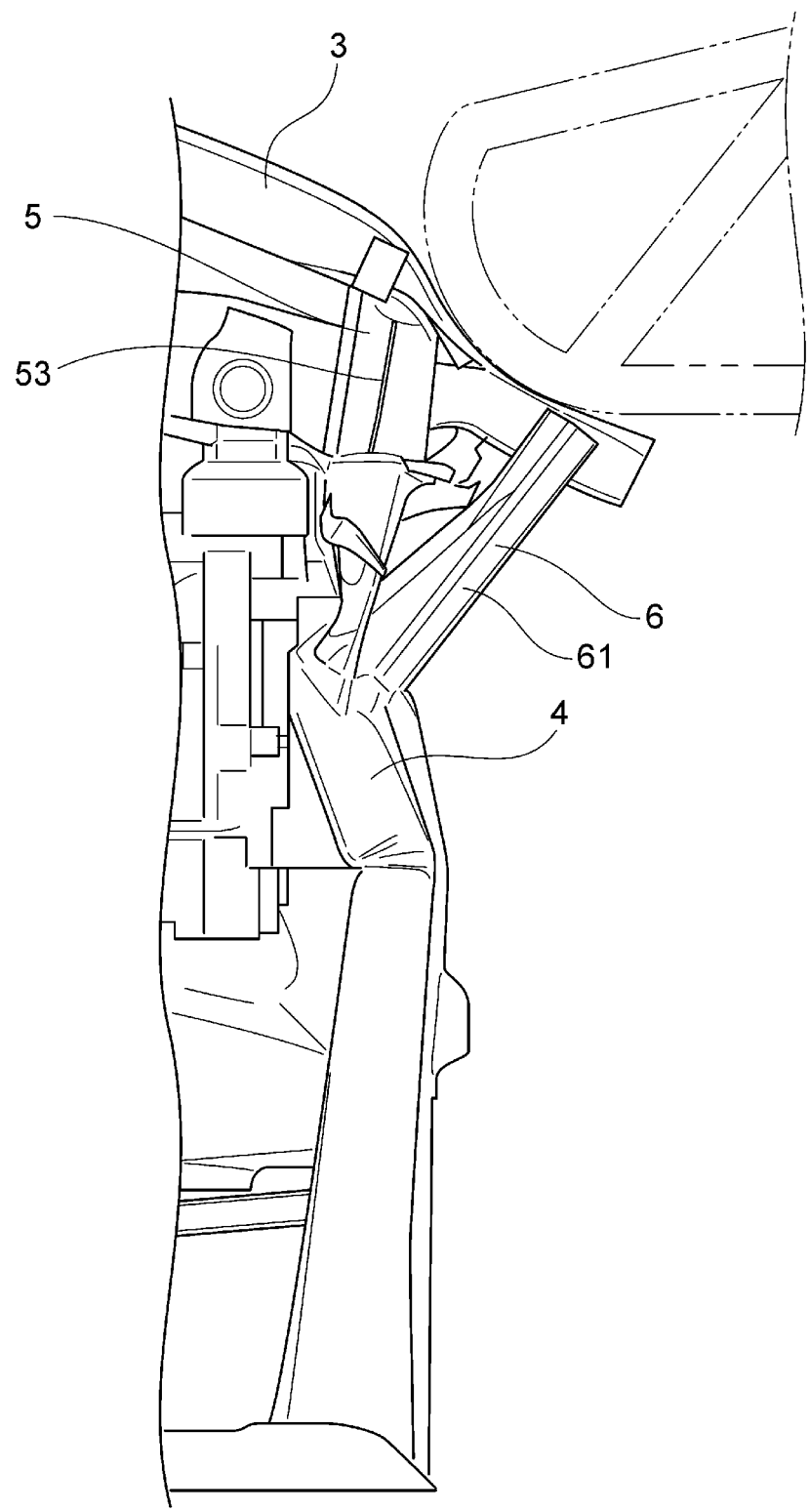
FIG. 6 is a partial plan view of the front body structure illustrating deformation in a small overlap frontal collision.

FIGS. 1 to 6 illustrate an embodiment of the disclosure. FIG. 1 is an external perspective view of a vehicle. FIG. 2 is a partial plan view of a front body structure of the vehicle. FIG. 3 is a partial plan view of the front body structure of the vehicle. FIG. 4 is a partial perspective view of the front body structure of the vehicle. FIG. 5 is a partial plan view of the front body structure with a cover removed. FIG. 6 is a partial plan view of the front body structure illustrating deformation in a small overlap frontal collision.

As illustrated in FIG. 1, a vehicle 1 includes a resin bumper 2 extending in a left-right direction at a front end of the vehicle 1. A bumper beam 3 (see FIG. 2) of a body of the vehicle 1 is disposed on a back surface side of the bumper 2.

As illustrated in FIG. 2, the vehicle 1 includes the body that is formed by, for example, assembling panel-shaped members formed by press-molding steel plates, and joining the panel-shaped members by spot welding or the like. The body of the vehicle 1 includes the bumper beam 3 extending in the left-right direction at a front end of the vehicle, a pair of left and right frames 4 extending in a front-rear direction, stays 5 that are provided at front ends of the frames 4 and that support the bumper beam 3, gussets 6 that extend obliquely forward from left and right outer ends of the frames 4 further to the front of the front end of the frame 4 with inclined outward in the left-right direction, and covers 7 that cover front ends of the gussets 6 from above and below. Each of the bumper beam 3 and the frames 4 has a closed cross section and constitutes a framework of the body of the vehicle 1. The cover 7 is attached to a predetermined position of the bumper beam 3 and a predetermined position of the stay 5.

As illustrated in FIG. 3, each stay 5 extends in the front-rear direction and has a closed cross section in a front view. The stay 5 includes a bead 51 at a predetermined position in the front-rear direction. The bead 51 extends in a circumferential direction of the stay 5. In the present embodiment, the bead 51 is recessed inward of the stay 5 and is provided over the stay 5 in the circumferential direction. In a collision, a portion of each stay 5 in front of the bead 51 is crushed prior to a portion of the stay 5 in rear of the bead 51.

The stay 5 includes flanges 52 and 53 on upper and lower portions of the stay 5. The flanges 52 and 53 join an inner panel on an inner side in the left-right direction and an outer panel on an outer side in the left-right direction. The inner panel and the outer panel form the closed cross section. A center line CL1 of the front flange 52 in front of the bead 51 and a center line CL2 of the rear flange 53 in rear of the bead 51 are shifted in the left-right direction in a plan view. The front flange 52 and the rear flange 53 are continuously formed via a coupling portion 51a disposed on the bead 51.

As illustrated in FIG. 4, in the present embodiment, the flanges 52 and 53 include (i) spot-welded joining portions 52a and 53a and (ii) low portions 52b and 53b which are alternately arranged in the front-rear direction. The low portions 52b and 53b include upper ends that are lower than the joining portions 52a and 53a. In the present embodiment, each of the joining portions 52a and 53a is shifted from the adjacent joining portion 52a or 53a in the left-right direction. In one example, the joining portions 52a and 53a are arranged in the front-rear direction with alternately shifted to one side and the other side in the left-right direction.

A rear end of the gusset 6 is fixed to the frame 4, and a front end of the gusset 6 is separated from the frame 4 in the left-right direction. The front end of the gusset 6 is separated from the bumper beam 3 in the front-rear direction. The gusset 6 includes a body 61 and an attachment portion 62. The body 61 has a closed cross section and extends obliquely forward. The attachment portion 62 is provided at a rear end of the body 61 and extends along the frame 4. The attachment portion 62 of the gusset 6 is fixed to an outer side surface of the frame 4 in the left-right direction by a bolt. The body 61 of the gusset 6 is supported at a predetermined position in the front-rear direction by a support portion 41 provided at the frame 4. As illustrated in FIG. 5, the bead 51 of the stay 5 is disposed on an imaginary line 64 extending from the front end of the gusset 6 in a direction orthogonal to a direction 63 in which the gusset 6 extends.

Behavior of the automobile vehicle 1 configured as described above in a small overlap frontal collision will be described.

In a small overlap frontal collision, a colliding object comes into contact with a left or right outer portion of the vehicle 1 with respect to the frame 4, and a left or right outer end of the bumper beam 3 is moved rearward at an initial stage of the collision. At this time, since the gusset 6 is separated from the bumper beam 3, no load acts on the gusset 6. Meanwhile, a rearward load acts on the stay 5 via the bumper beam 3, and the portion of the stay 5 in front of the bead 51 is crushed prior to the portion of the stay 5 in rear of the bead 51. At this time, since the center line CL1 of the flange 52 and the center line CL2 of the flange 53 are shifted on the front side and the rear side with respect to the bead 51, a load acting on the front side of the stay 5 is prevented from being transmitted to the rear side of the stay 5 via the flanges 52 and 53, and the entire stay 5 is prevented from being moved to the left and right inner sides around a rear end side of the stay 5. After the bumper beam 3 is retracted to a position where the bumper beam 3 comes into contact with the front end of the gusset 6, as illustrated in FIG. 6, a reaction force against an input force from the colliding object can be generated in the gusset 6 and the portion of the stay 5 in rear of the bead 51.

Here, since the bead 51 of the stay 5 is disposed on the imaginary line 64, a portion of the bumper beam 3 in front of the stay 5 comes into contact with the portion of the stay 5 in rear of the bead 51 substantially at the same time as the left or right outer end of the bumper beam 3 is retracted to a position where the left or right outer end comes into contact with the front end of the gusset 6. Accordingly, the reaction force can be generated in a well-balanced manner in the stay 5 and the gusset 6.

Since the front end of the gusset 6 is covered from above and below with the cover 7, an upward movement and a downward movement of the gusset 6 can be prevented by the cover 7, and the frame 4 can be pushed in by the rear end of the gusset 6 to reliably transfer the load from the gusset 6 to the frame 4.

As described above, according to the front body structure of the vehicle in the present embodiment, it is possible to prevent the stay from being moved toward the inner side in the left-right direction at the initial stage of the small overlap frontal collision.

In the above embodiment, each of the flanges 52 and 53 of the stay 5 is alternately shifted to one side and the other side in the left-right direction at the respective one of the joining portions 52a and 53a. Alternatively, each of the flanges may be linearly arranged without being shifted in the left-right direction. In short, the center line of one of the flanges that is in front of the bead of the stay and the center line of the other flange that is in rear of the bead of the stay may simply be shifted in the left-right direction in a plan view.

In the above embodiment, the bead 51 is provided over an entire circumference of the stay 5. Alternatively, the bead may be disposed on at least a part of the stay in the circumferential direction. In the above embodiment, the bead 51 has a recessed shape. Alternatively, the bead 51 may have a protruding shape.

In the above embodiment, the bead 51 of the stay 5 is disposed on the imaginary line 64. Even in a layout in which the bead 51 is not disposed on the imaginary line 64, the portion of the stay 5 in front of the bead 51 can be crushed before the reaction force is generated in the gusset 6 as long as the gusset 6 is separated from the bumper beam 3. If the gusset 6 extends further to the front of the front end of the frame 4, the reaction force against the input force from the colliding object can be generated in the gusset 6 and the portion of the stay 5 in rear of the bead 51.

In the above embodiment, the cover 7 covers the front end of the gusset 6 from above and below. Alternatively, the cover 7 may be omitted as long as an upward and downward movement of the gusset 6 in the collision does not cause an issue.

The embodiment(s) of the disclosure have been described above. It is noted that the above embodiment(s) do not limit the claimed invention. Furthermore, it is noted that not all combinations of features described in the embodiment(s) are necessary for a solution to a problem of the disclosure.

The invention claimed is:
1. A front body structure provided on a vehicle, the front body structure comprising:
   a bumper beam extending in a left-right direction of the vehicle at a front end of the vehicle;
   a left frame and a right frame in pairs, the left frame and the right frame extending in a front-rear direction of the vehicle;
   stays supporting the bumper beam, each of the stays being disposed at a front end of a corresponding one of the left frame and the right frame; and
   gussets disposed so as to be separated from the bumper beam, each of the gussets extending inclined outward in the left-right direction, and obliquely forward from a corresponding one of an outer end of the left frame and an outer end of the right frame to a front of a corresponding one of a front end of the left frame and a front end of the right frame,
   wherein each of the stays comprises a bead at a predetermined position in the front-rear direction, the bead being recessed inward of a corresponding one of the stays and extending in a circumferential direction of the corresponding one of the stays.
2. The front body structure according to claim 1, wherein each of the stays comprises a flange, the flange being provided on each of an upper portion and a lower portion of the each of the stays, the flange extending in the front-rear direction, and
   wherein a center line of a front portion of the flange which is in front of the bead is apart from a center line of a rear portion of the flange which is in rear of the bead in the left-right direction in a plan view of the vehicle.
3. The front body structure according to claim 2, wherein the bead of each of the stays is disposed on an imaginary line extending from a front end of a corresponding one of the gussets in a direction orthogonal to a direction in which the corresponding one of the gussets extends.
4. The front body structure according to claim 3, further comprising:
   covers each of which covers the front end of the corresponding one of the gussets from above and below.
5. The front body structure according to claim 2, further comprising:
   covers each of which covers a front end of a corresponding one of the gussets from above and below.
6. The front body structure according to claim 1, further comprising:
   covers each of which covers a front end of a corresponding one of the gussets from above and below.
7. The front body structure according to claim 1, wherein each of the stays comprises a flange, the flange being provided on each of an upper portion and a lower portion of the each of the stays, the flange extending in the front-rear direction.
8. The front body structure according to claim 7, wherein the flange includes:
   a spot-welded joining portion; and
   low portions which are alternately arranged in the front-rear direction.
9. The front body structure according to claim 8, wherein the low portions include upper ends that are positioned lower than the joining portion.
10. The front body structure according to claim 9, wherein each of the joining portions is shifted from an adjacent joining portion of the joining portions in the left-right direction.
11. The front body structure according to claim 8, wherein each of the joining portions is shifted from an adjacent joining portion of the joining portions in the left-right direction.
12. The front body structure according to claim 7, further comprising:
   covers each of which covers a corresponding one of the gussets from above and below.
13. The front body structure according to claim 1, further comprising:
   covers each of which covers a corresponding one of the gussets from above and below.
14. A front body structure provided on a vehicle, the front body structure comprising:
   a bumper beam extending in a left-right direction of the vehicle at a front end of the vehicle;
   a left frame and a right frame in pairs, the left frame and the right frame extending in a front-rear direction of the vehicle;
   stays supporting the bumper beam, each of the stays being disposed at a front end of a corresponding one of the left frame and the right frame; and
   gussets disposed so as to be separated from the bumper beam, each of the gussets extending inclined outward in the left-right direction, and obliquely forward from a corresponding one of an outer end of the left frame and an outer end of the right frame to a front of a corresponding one of a front end of the left frame and a front end of the right frame,
   wherein each of the stays comprises a bead at a predetermined position in the front-rear direction, the bead extending in a circumferential direction of a corresponding one of the stays,
   wherein each of the stays comprises a flange, the flange being provided on each of an upper portion and a lower portion of the each of the stays, the flange extending in the front-rear direction, and
   wherein a center line of a front portion of the flange which is in front of the bead is apart from a center line of a rear portion of the flange which is in rear of the bead in the left-right direction in a plan view of the vehicle.
15. A front body structure provided on a vehicle, the front body structure comprising:
   a bumper beam extending in a left-right direction of the vehicle at a front end of the vehicle;
   a left frame and a right frame in pairs, the left frame and the right frame extending in a front-rear direction of the vehicle;
   stays supporting the bumper beam, each of the stays being disposed at a front end of a corresponding one of the left frame and the right frame; and
   gussets disposed so as to be separated from the bumper beam, each of the gussets extending inclined outward in the left-right direction, and obliquely forward from a corresponding one of an outer end of the left frame and an outer end of the right frame to a front of a corresponding one of a front end of the left frame and a front end of the right frame,
   wherein each of the stays comprises a bead at a predetermined position in the front-rear direction, the bead extending in a circumferential direction of a corresponding one of the stays,
   further comprising:
   covers each of which covers a front end of a corresponding one of the gussets from above and below.

* * * * *